United States Patent [19]

Raines et al.

[11] Patent Number: 4,842,453
[45] Date of Patent: Jun. 27, 1989

[54] GUIDE APPARATUS FOR DRILLING OBLIQUE HOLES

[75] Inventors: James G. Raines, Lakeside; Harry Coleman, San Diego, both of Calif.

[73] Assignee: West Products, San Diego, Calif.

[21] Appl. No.: 935,288

[22] Filed: Nov. 26, 1986

[51] Int. Cl.$^4$ .............................................. B23B 49/00
[52] U.S. Cl. ......................................... 408/89; 408/97; 408/115 R; 408/241 B
[58] Field of Search ...................... 408/103, 109, 72 R, 408/115 R, 712, 241 B, 241 S, 72 B, 115 B, 97, 110, 112, 89; 409/218

[56] References Cited

U.S. PATENT DOCUMENTS

| | | | |
|---|---|---|---|
| 2,338,530 | 1/1944 | Ognibene et al. | 408/241 B X |
| 3,534,639 | 10/1970 | Treichler | 408/115 R X |
| 3,591,303 | 7/1971 | Conway | 408/115 R |
| 3,626,513 | 12/1971 | Pytlak | 408/103 X |
| 4,132,496 | 1/1979 | Casto | 408/115 R X |
| 4,331,411 | 5/1982 | Kessinger et al. | 408/97 |
| 4,391,558 | 7/1983 | Perry | 408/115 R X |
| 4,466,601 | 8/1984 | Raines | 408/109 X |

*Primary Examiner*—Z. R. Bilinsky
*Attorney, Agent, or Firm*—Brown, Martin, Haller & McClain

[57] ABSTRACT

A guide apparatus for drilling oblique holes comprises a fixture for supporting a wood stock at an adjustable angle to a reference surface, and a guide assembly for positioning a drill bit attached to a drill driving mechanism over the end of the wood stock and for guiding the reciprocation of the drill bit to enable the drill bit to enter the surface of the wood stock adjacent the end obliquely and to pass out of the end to form a hole for receiving a screw. The guide assembly is adjustable to vary the maximum travel of the drill bit towards the wood stock.

13 Claims, 3 Drawing Sheets

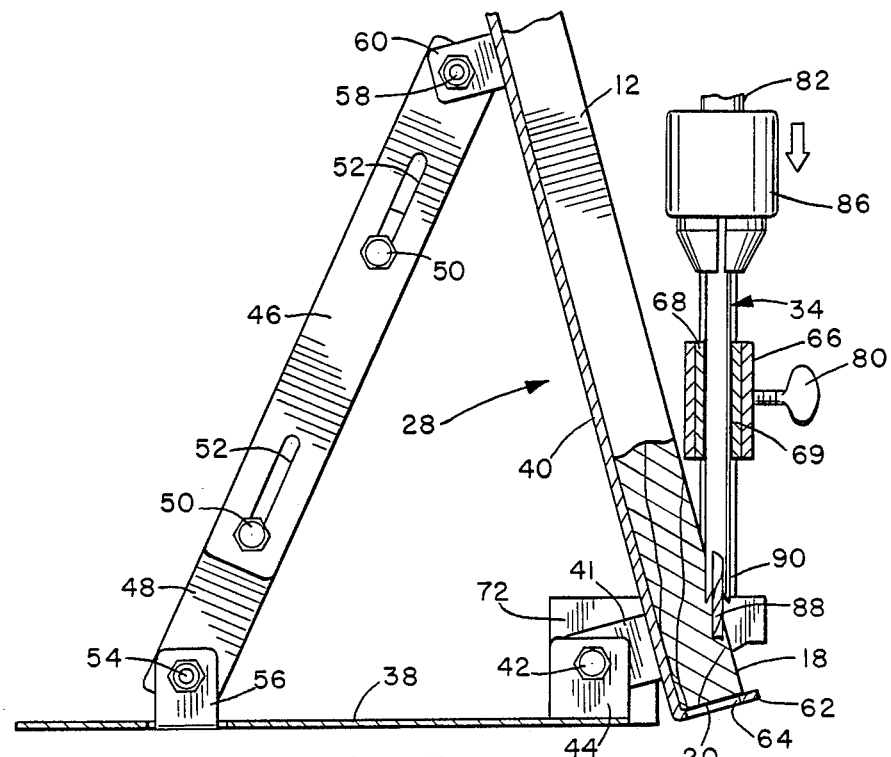
FIG. 3
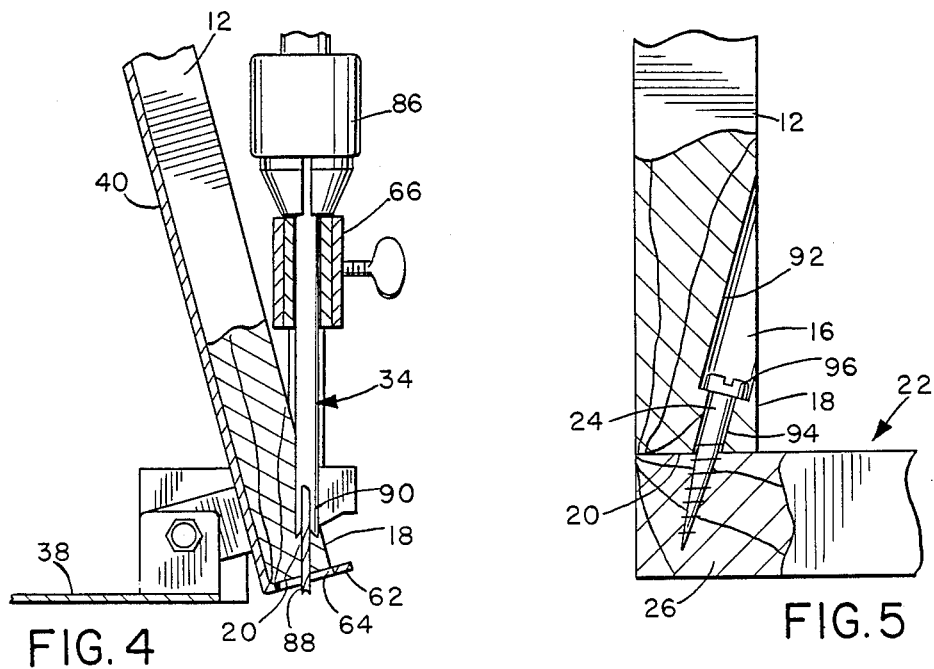
FIG. 4
FIG. 5

GUIDE APPARATUS FOR DRILLING OBLIQUE HOLES

BACKGROUND OF THE INVENTION

The present invention relates generally to workpiece holding fixtures for use in drilling holes, and is particularly directed to an apparatus for use in drilling oblique holes in work pieces such as wood stocks and the like.

When attaching an edge finishing strip or frame to a surface piece such as a table, counter top, or a shelf, or when forming joints between two pieces of wood, for example in cabinet making, it is well known to use screws extending at an oblique angle through a concealed face to the edge of one of the work pieces. The screws are then driven through the butting edge of the adjacent, undrilled workpiece to make the joint. The oblique angle holes, also known as pocket holes, must first be drilled through the appropriate workpiece, and various machines for drilling such holes are known. However, these machines are generally expensive and not practical for the average hobbyist or homeowner, or for small carpentry shops.

In U.S. Pat. No. 4,466,601 of Raines, a holding fixture for attachment to a drill press table is described, which supports a panel or workpiece at a desired angle to the drill press table with its end edge positioned beneath the drill bit, to enable the drilling of oblique holes entering one surface of the panel and exiting through its adjacent end edge.

This fixture is convenient to use, but can only be used in conjunction with a drill press, making it unsuitable for those hobbyists or others who do not own a drill press and do not wish to go to the expense of purchasing one.

SUMMARY OF THE INVENTION

It is an object of the present invention to provide a guide apparatus to enable oblique holes to be drilled with a hand drill or the like.

According to the present invention, a guide apparatus is provided which comprises a support device or fixture for adjustably supporting a panel or workpiece at an angle to a reference surface, and a guide assembly for positioning a drill bit attached to a drill driving mechanism over an end of the workpiece, and for guiding the drill bit on reciprocation to drill an oblique hole in the underlying surface of the workpiece and out through the end edge of the workpiece.

In a preferred embodiment of the invention the guide assembly is designed for cooperation with the support fixture as described in U.S. Pat. No. 4,466,601 of Raines, which basically comprises a base support member for attachment to a suitable reference surface and an upstanding, generally L-shaped support table pivotally attached to the base support member to adjust the support table to the required angle from the horizontal to enable the drilling of oblique holes. The lower end of the support table has an integrally formed outwardly extending foot plate on which the lower edge of a workpiece will rest during drilling, and the foot plate has a suitable clearance hole permitting passage of a drill through the workpiece. In the preferred embodiment of the invention the guide assembly comprises a guide member having a guide bore for receiving a drill bit, and support means for adjustably supporting the guide member with its guide bore positioned directly above the clearance hole in the foot plate of the support table. Preferably, the guide member itself acts as a stop for the drill chuck, so that the height of the guide member above the foot plate will determine the maximum travle of the drill bit on reciprocation through the guide bore. The guide assembly may be integral with or securable to the holding fixture, or may comprise a completely separate fixture with suitable alignment means for accurately positioning the guide member relative to the support table.

In one embodiment of the invention, the support means comprises a pair of spaced posts on which the guide member is slidably mounted to straddle an underlying workpiece. The posts are suitably mounted at their lower ends on support feet or a suitable base member or plate, which may be securable to the support fixture or engageable on opposite sides of the support fixture for suitable centering of the guide hole in the slidably mounted guide member. The base member may itself be securable to a suitable reference surface if the holding fixture and guide assembly are completely unconnected parts. The guide member preferably has spaced openings for slidable engagement on the support posts, and suitable locking members are provided for locking the guide member at the desired height on the posts.

When the apparatus is fully assembled with a workpiece or panel supported on the support table, an oblique hole can be drilled by simply inserting a suitable drill bit mounted on a hand drill or other drill driving mechanism through the guide hole in the drill guide member until it contacts the upper surface of a workpiece. The drive motor is then switched on, causing the drill bit to reciprocate through the underlying surface of the panel and out through the end edge. The maximum travel of the drill bit is limited by the collet chuck contacting the upper face of the guide member, which acts as a stop.

This apparatus therefore allows oblique holes to be drilled quickly and easily using simple hand drills, which are relatively inexpensive as compared to drill presses, for example. The hand drill in the preferred arrangement does not have to be adjusted in any way for use with the guide assembly, unlike some known hand drill guides for standard drilling operations in which the collet chuck and drill bit must be removed before threading the drive shaft through a suitable guide member and then reattaching the collet chuck to the drive shaft. In this type of guide device the entire guide member is driven up and down with the drill bit.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 3 is an enlarged sectional view taken on the line 3—3 of FIG. 2 showing a drill at the beginning of a drilling operation;

FIG. 4 is a view similar to a portion of FIG. 3, with the drill stopped at the required hole depth;

FIG. 5 is a side elevation view, partially cut away, of a typical joint made by using the fixture;

DETAILED DESCRIPTION OF THE PREFERRED EMBODIMENTS

Figure 1:
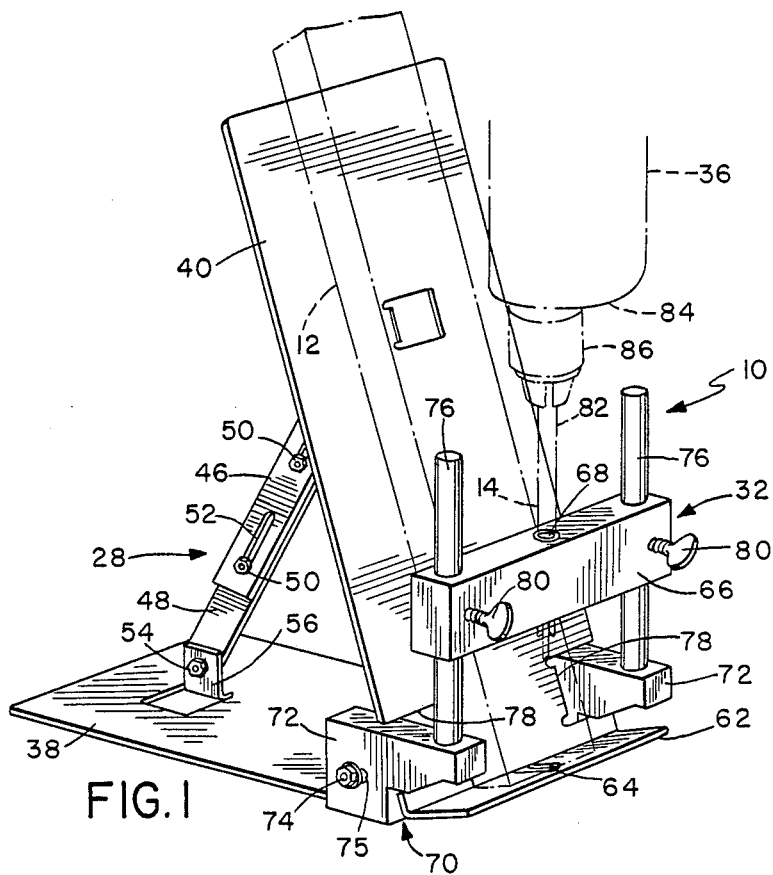
FIG. 1 is a perspective view of the holding fixture with an integral drill guide assembly according to one embodiment of the invention.
Figure 2:
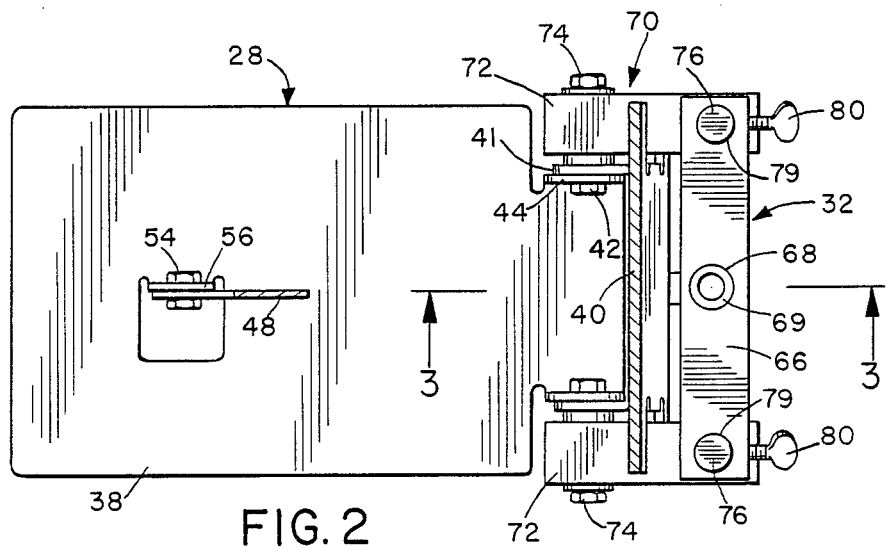
FIG. 2 is an enlarged top plan view of the apparatus of FIG. 1 with the work supporting table cut away.

FIGS. 1 to 4 of the drawings show a first embodiment of a holding apparatus 10 according to the invention for holding a workpiece 12 and guiding a drill 14 to drill an oblique hole 16 through a concealable surface 18 of the workpiece, suitably a wood stock or panel, and out through the adjacent edge 20 of the workpiece. FIG. 5 shows a typical joint 22 which can be made using this fixture, by first drilling an oblique hole in one workpiece or panel 12, and then driving a screw 24 through the pre-drilled pocket hole 16 and into the undrilled workpiece or panel 26 to form the joint. This can be used, for example, in making tables, counter tops, cabinets, shelves and the like.

The holding apparatus 10 will now be described in more detail. The apparatus basically comprises a holding fixture 28 for holding a workpiece, such as a wood panel 12, at an adjustable angle to a suitable flat reference surface, and a guide fixture 32 for guiding a drill bit 34 secured to a suitable drill driving mechanism 36 for reciprocation through the underlying surface of the wood panel to drill a suitable oblique hole.

The reference surface may be any suitable flat surface such as a table, work bench or the like. The guide assembly is arranged to guide the drill bit of a standard hand drill or the like at the desired angle to the workpiece, so that relatively inexpensive hand drills can be used for drilling oblique pocket holes.

The holding fixture is preferably substantially the same as that described in U.S. Pat. No. 4,466,601 of Raines, issued Aug. 21, 1984 and entitled "Holding Fixture for Drilling Oblique Holes", the contents of which are herein incorporated by reference. The fixture 28 basically comprises a base support member or plate 38 for attachment to a suitable reference surface via a suitable C clamp or similar device (not shown), and an upstanding support table or plate 40. Table 40 is pivotally mounted at its lower end on the base member via a pair of brackets 41 which are pivotally secured by bolts 42 to upstanding hinge brackets 44 (see FIG. 3).

The table 40 is positioned and held in its selected angular position by means of an extensible link comprising an upper link member 46 and a lower link member 48. The upper and lower link members are adjustably secured together by means of screws 50 which pass through slots 52 in one of the link members and are threaded into the other member, to allow lengthening or shortening of the extensible link. The link is pivotally secured at its lower end via bolt 54 to an upstanding bracket 56 on the base member, and is pivotally secured at its upper end via bolt 58 to a bracket 60 on the back of support table 40. Thus the link can be adjusted in length to vary the angle of the support table relative to the reference surface, according to the particular dimensions of the workpiece to be drilled.

The support table has a footplate 62 at its lower end extending at substantially 90 degrees to the table, for supporting the lower end of the workpiece as indicated in the drawings. The footplate 62 has a substantially centrally located clearance hole 64 for permitting a drill bit to pass through and out of the supported lower edge of the workpiece.

The guide assembly or fixture 32 according to the preferred embodiment of the invention is designed to guide the drill bit of a suitable drill for drilling oblique holes through a workpiece supported on a holding fixture of this type. The fixture 32 may be formed integrally with the holding fixture, or may be separate but securable to it as shown in FIGS. 1 to 4, or may be completely separate from the holding fixture and designed for interfitting engagement with it, as shown in the alternative embodiment of FIGS. 6 and 7. Although the guide fixture shown in the drawings is particularly designed for use with a holding fixture of the type described in U.S. Pat. No. 4,466,601 referred to above, it may alternatively be used with any suitable holding fixture for supporting workpieces at an adjustable angle relative to a drill for drilling oblique holes.

The guide fixture 32 shown in FIGS. 1 to 4 basically comprises a guide member 66 having a central through bore or guide bore 68 of dimensions suitable for guiding a drill bit as it reciprocates through the bore, as indicated in FIGS. 3 and 4, and a support assembly 70 for adjustably supporting the guide member 66 above the workpiece supporting foot plate of the support table. The bore may have a suitable guide sleeve 69 extending through it, which may be interchangeable with different diameter guide sleeves, for example, for slidably receiving different diameter drill bits.

The support assembly 70 comprises a pair of feet or base support blocks 72 which are releasably secured to the base plate 38 on opposite sides of the support table 40 by means of bolts 74 which extend through elongate slots 75 in the feet to clamp them against the respective hinge brackets, and a pair of upstanding posts 76 which are mounted on portions of the feet which project through the recesses 78 which are provided on opposite side edges of the base plate when the brackets 41 are cut out. As shown in FIG. 1, the projecting portions of the feet have cut-outs or indents in their lower faces for clearing the footplate 62. The guide member has openings or bores 79 at its opposite side edges which engage slidably over the respective support posts 76, so that the member effectively straddles the support table 40 and its central guide bore can be positioned directly above the clearance hole in the footplate. Suitable locking screws 80 are provided for locking the guide member at a selected position on the support posts. The elongate slots in the feet enable some adjustment of the posts for accurate centering of bore 58 over clearance hole 64 and to adjust for different workpiece thickness.

The use of the apparatus in drilling oblique pocket holes will now be described. In operation, the holding fixture will be positioned on a suitable flat surface and secured in position by a C clamp or the like. The workpiece is placed on the support table 40, and the angle of the support table is suitably adjusted according to the workpiece thickness to enable drilling of the correct angle hole so that it will pass through the end of the workpiece with sufficient clearance. The height of the guide member above the foot plate can be adjusted by loosening screws 80 and moving the guide member to a selected position to allow sufficient clearance for the underlying workpiece and to limit the maximum travel of the drill bit. The position of feet 72 can also be adjusted via elongate slots 75. The workpiece may be held by hand as the hole is being drilled, or alternatively a suitable positioning device (not shown) may be used to hold the workpiece in the correct position.

Thus, once the support table has been adjusted to the correct angle, the guide member can be adjusted according to the thickness of the workpiece so that the guide bore is positioned directly above the clearance hole and above the desired position on the lower edge of the workpiece through which the oblique hole is to be drilled. Once the guide member has been adjusted, it is secured in place by tightening screws 80.

A suitable drill bit 34 of the known type used for drilling oblique holes is connected to the drive shaft 82 of a hand drill motor in a suitable housing 84 by means of collet chuck 86, in a standard fashion. The drill bit 34 is a special type which will bite into the wood at a shallow angle without sliding off, and has a tip portion 88 with a concave cutter and outside cutting edges, and an enlarged counterbore portion 90 which also has a concave cutter. The drill bit is inserted through the guide bore as indicated in FIG. 3, until it contacts the workpiece and the drill motor is then switched on. The drill bit will enter the upper surface of the inclined workpiece as indicated in FIG. 3, and will be driven downwardly through the workpiece at an oblique angle until the collet chuck 86 meets the upper surface of guide member, which acts as a stop to limit the maximum downward movement of the drill bit, as shown in FIG. 4, and thus determines the depth of the counterbore 92. At this point the drill bit will have passed completely through the workpiece and out through the end edge, the tip portion drilling a clearance pilot hole 94 and the counterbore portion drilling the counterbore 92 for the screw head 96 (see FIG. 5).

When the oblique hole or holes have been drilled, the pre-drilled workpiece can be secured to the desired edge of an undrilled workpiece to form a joint, as indicated in FIG. 5. The joint may be a right angle joint as shown, or a flat edge to edge joint, for example connecting a finishing strip or frame to a table. The screw is driven through the oblique pilot hole and into the adjacent edge of the undrilled workpiece, so that its head is recessed into the workpiece as shown. The exposed oblique hole may be filled if desired.

Thus the apparatus described above can be assembled quickly and easily in order to drill oblique holes accurately in workpieces using standard hand drills and the like, instead of needing relatively expensive, specialized equipment such as a drill press for drilling such holes. Thus the ordinary home hobbyist or small carpentry shop can readily purchase relatively inexpensive apparatus to enable accurate and easy drilling of oblique pocket holes.

Figure 6:
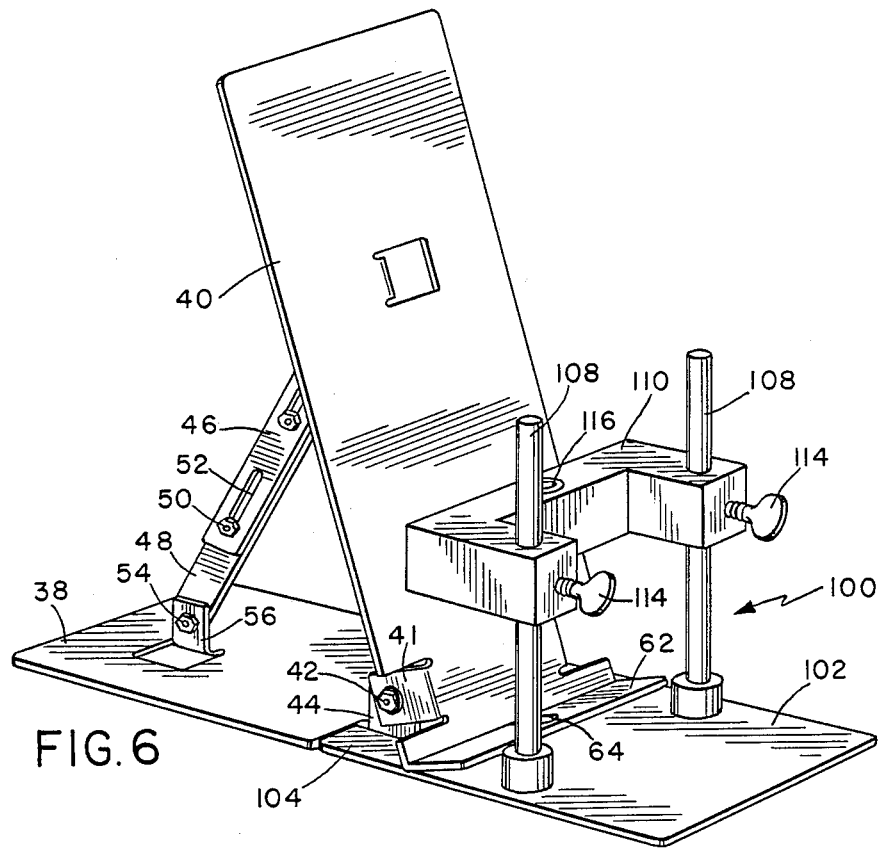
FIG. 6 is a perspective view of a holding fixture with a separate but interfitting drill guide, according to a second embodiment of the invention.
Figure 7:
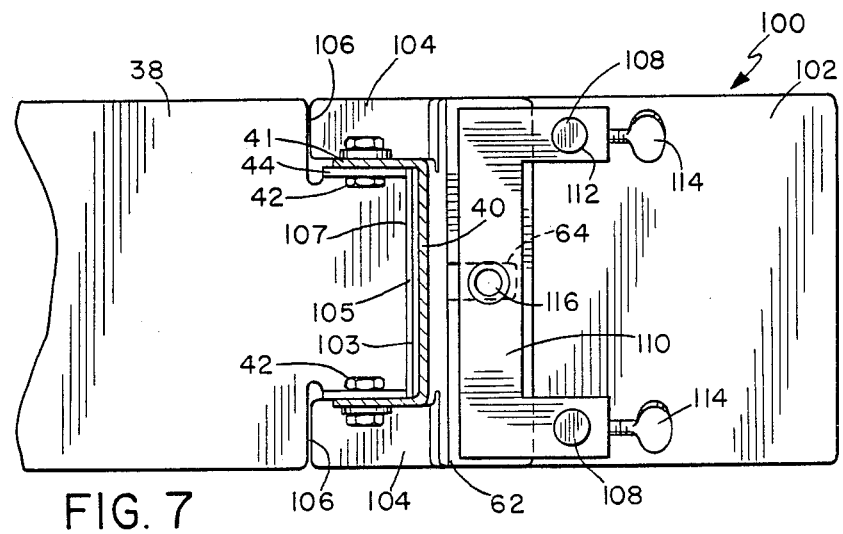
FIG. 7 is an enlarged top plan view of the apparatus of FIG. 6, with the work supporting table cut away.

FIGS. 6 and 7 show a modified embodiment of the apparatus according to the invention. In this embodiment the holding fixture is similar or identical to that described above in connection with FIGS. 1 to 5, and like reference numerals have been used where appropriate. The guide fixture 100 in this embodiment is modified and comprises a completely separate part from the holding fixture, which is arranged to interfit with the holding fixture for accurate centering of the guide member.

As shown in FIGS. 6 and 7, the guide fixture 100 comprises a flat base plate or member 102 which has a recess 103 in its forward edge defining projecting fingers or flanges 104 arranged to straddle the hinge flanges of the holding fixture base plate 38 and butt up against the base plate edges 106 as best shown in FIG. 7 for accurate alignment of the guide fixture. When the base plate is fitted against the support fixture base plate as shown, there is preferably still a small clearance 105 between the forward edge 107 of base plate and the inner edge 109 of the recess in base plate 102, as seen in FIG. 7, to ensure that the fingers can be butted fully against the edges 106.

Upstanding support posts 108 project upwardly from the base plate 102 on the opposite side of the support plate, and a generally square corner, C-shaped guide member 110 has openings 112 adjacent its free ends which engage slidably over the support posts. Locking screws 114 are provided for securing the guide member at the selected height on the guide posts, according to the thickness of the workpiece to be drilled. A guide bore 116 for guidably receiving the drill bit is provided at the center of the guide member 110 so that it can be positioned directly above the clearance opening in the footplate and above the desired position on an edge of a workpiece for exit of a drilled oblique hole. Thus, as in the previous embodiment, the angle of the support table and the height of the guide member can be adjusted until they are in the correct relative position for drilling a suitable oblique borehole. The base plate 102 may be secured on the reference surface when correctly positioned by means of a C clamp or similar device.

The use of the apparatus shown in FIGS. 6 and 7 is substantially the same as described above in connection with the previous embodiment.

Although in the embodiments described above the guide fixture is either secured to or interfitting with the holding fixture, these fixtures may alternatively be entirely separate. However, this requires the operator to accurately position the guide fixture so that the guide bore is above the foot plate and centered on the clearance hole.

Thus the apparatus of this invention provides a simple and inexpensive means for drilling oblique holes using a standard, inexpensive hand drill or the like.

Although some preferred embodiments of the invention have been described above by way of example, it will be understood by those skilled in the field that modifications may be made to the disclosed embodiments without departing from the scope of the invention, which is defined by the appended claims.

We claim:

1. A holding apparatus for holding a workpiece in angular relation to a drill bit attached to a driving mechanism for drilling an oblique hole in a workpiece, the apparatus comprising: holding means consisting of a base member for mounting on a reference surface and an upstanding tiltable table attached at a selected angle to said base member, said table comprising a flat portion and an outwardly projecting foot portion forming a generally L-shaped support surface, said table supporting a workpiece in said L-shaped surface 2. The apparatus as claimed in claim 1, further including securing means for securing said support means to said holding means.

3. Apparatus as claimed in claim 1, wherein said base means comprises a pair of separate, spaced feet, one post extending upwardly from each foot, the spaced feet comprising said interfitting formations for straddling opposite sides of said tiltable table with the guide member overlying the lower end of said support table.

4. Apparatus as claimed in claim 3, including means for adjustably securing said feet to said holding means.

5. Apparatus as claimed in claim 1, wherein said guide bore is located substantially at the center of said guide member between said guide posts.

6. Apparatus as claimed in claim 5, wherein said guide member projects outwardly from the plane of the support posts towards said support table, and said guide hole is located in the outwardly projecting portion of said guide member.

7. The apparatus as claimed in claim 6, wherein the guide member is of square corner, C-shaped with openings in its free ends which engage slidably on said support posts.

8. The apparatus as claimed in claim 1, including a series of guide sleeves for selective engagement in said guide bore for slidably receiving different diameter drill bits.

9. Apparatus as claimed in claim 1, wherein said base means comprises a pair of separate, spaced feet, one post extending upwardly from each foot, said feet comprising means for straddling opposite sides of said tiltable table with the guide member overlying said foot portion, and adjustable securing means for releasably securing said feet to opposite sides of said tiltable table, said adjustable securing means comprising means for allowing said feet to move a predetermined distance relative to said base member to adjust the position of said guide member.

10. Apparatus as claimed in claim 9, wherein said interfitting formations comprise cut outs on opposite side edges of said base member adjacent said tiltable table for engagement with said feet.

11. A holding apparatus for holding a workpiece in angular relation to a drill bit attached to a driving mechanism for drilling an oblique hole in a workpiece, the apparatus comprising:

holding means consisting of a base member for mounting on a reference surface and an upstanding tiltable table attached to the base member, said table comprising a flat portion and an outwardly projecting foot portion forming a generally L-shaped support surface, said table comprising means for supporting a workpiece in said L-shaped surface to allow drilling of an oblique hole through a surface and adjacent end face of the workpiece, said table having a centrally located clearance hole for permitting passage of a drill bit through an end edge of a workpiece supported on said foot portion;

a stationary guide assembly for positioning a drill bit over said foot portion, said guide assembly comprising a pair of spaced, separate feet for engagement on opposite sides of said base member, releasable securing means for releasably securing said feet to said base member, each foot having an upstanding support post projecting upwardly from it, and a guide member extending between said support posts for positioning above said foot portion, said guide member having a guide bore aligned with said clearance hole for slidably receiving a drill bit attached to a drill driving mechanism for guided reciprocation of the drill bit towards and away from the workpiece, an upper surface comprising stop means for engaging by a chuck from which the drill projects to limit maximum travel of said drill bit through said guide bore, connecting means at opposite ends for slidably engaging said support posts, and releasable locking means for locking said guide member at a selected height on said support posts.

12. The apparatus as claimed in claim 11, wherein the tiltable plate has cut outs on its opposite side edges, said base member having cut outs on its opposite side edges for interfitting engagement with said feet, said feet having portions projecting through said cut outs in said tiltable plate, said posts projecting upwardly from the projecting ends of said feet, said securing means being adjustable for varying the position of said posts relative to said tiltable table, and said projecting ends of said feet having cut-outs on their lower faces for clearing the foot portion of said tiltable table.

13. The apparatus as claimed in claim 11, wherein said guide member comprises a straight bar extending between said support posts and said guide bore is located at the center of said bar.

* * * * *

UNITED STATES PATENT AND TRADEMARK OFFICE
CERTIFICATE OF CORRECTION

PATENT NO. : 4,842,453

DATED : June 27, 1989

INVENTOR(S) : Raines et al.

It is certified that error appears in the above-identified patent and that said Letters Patent is hereby corrected as shown below:

Column 6, line 57, in Claim 1, following the word "surface" the remainder of the claim should be added as follows:

to allow drilling of an oblique hole through a surface and adjacent edge of the workpiece at a location where the workpiece is directly supported by said table against the deflection resulting from said drilling, said foot portion having a centrally located clearance hole for permitting passage of a drill bit through an end edge of a workpiece supported on said foot portion;

- a stationary guide member having a guide bore for slideably receiving a drill bit attached to a drill driving mechanism for guided reciprocation of the drill bit towards and away from the workpiece, the guide member having an upper surface comprising a stop means for engaging by a chuck from which the drill bit projects to limit maximum travel of said drill bit through said guide bore;
- support means for supporting and centering said guide member relative to said holding means comprising:

UNITED STATES PATENT AND TRADEMARK OFFICE
CERTIFICATE OF CORRECTION

PATENT NO.   : 4,842,453

DATED        : June 27, 1989

INVENTOR(S)  : Raines et al.

It is certified that error appears in the above-identified patent and that said Letters Patent is hereby corrected as shown below:

> base means for mounting on said reference surface, a pair of upstanding, spaced support posts on said base means, said guide member having means on opposite sides of said guide bore for slidably engaging said support posts, releasable locking means for locking said guide member at a selected height on said support posts, said base means being separate from said holding means, and said base means and said holding means having interfitting formations for centering said guide member relative to said holding means with said guide bore aligned with said clearance hole.

Signed and Sealed this

Twenty-fourth Day of July, 1990

Attest:

HARRY F. MANBECK, JR.

*Attesting Officer*   *Commissioner of Patents and Trademarks*